(12) United States Patent
Hutchison et al.

(10) Patent No.: US 9,341,644 B2
(45) Date of Patent: May 17, 2016

(54) MEMS APPARATUS WITH A MOVABLE WAVEGUIDE SECTION

(71) Applicant: Intel Corporation, Santa Clara, CA (US)

(72) Inventors: David N. Hutchison, Santa Clara, CA (US); John Heck, Berkeley, CA (US)

(73) Assignee: Intel Corporation, Santa Clara, CA (US)

( * ) Notice: Subject to any disclaimer, the term of this patent is extended or adjusted under 35 U.S.C. 154(b) by 212 days.

(21) Appl. No.: 14/106,172

(22) Filed: Dec. 13, 2013

(65) Prior Publication Data
US 2015/0316580 A1 Nov. 5, 2015

(51) Int. Cl.
| | |
|---|---|
| *G01P 15/093* | (2006.01) |
| *G01D 5/26* | (2006.01) |
| *G01P 15/14* | (2013.01) |
| *G02F 1/025* | (2006.01) |
| *G01C 19/56* | (2012.01) |
| *G02B 26/08* | (2006.01) |

(52) U.S. Cl.
CPC ............... *G01P 15/093* (2013.01); *G01D 5/268* (2013.01); *G01P 15/14* (2013.01); *G02F 1/025* (2013.01); *G01C 19/56* (2013.01); *G02B 26/0858* (2013.01)

(58) Field of Classification Search
CPC .. G01C 19/56; G01P 15/093; G02B 26/0858; B81B 3/0021; Y10S 200/19
See application file for complete search history.

(56) References Cited

U.S. PATENT DOCUMENTS

| 4,900,918 A | 2/1990 | Killian |
| 5,367,584 A * | 11/1994 | Ghezzo ............... G02B 6/1221 385/17 |
| 5,926,591 A | 7/1999 | Labeye et al. |
| 6,856,712 B2 | 2/2005 | Fauver et al. |

(Continued)

FOREIGN PATENT DOCUMENTS

| CN | 1743850 A | 3/2006 |
| CN | 101960252 A | 1/2011 |

(Continued)

OTHER PUBLICATIONS

I. De Vlaminck et al., "Detection of nanomechanical motion by evanescent light wave coupling" Applied Physics Letters 90, 233116, 2007, 3 pages.

(Continued)

*Primary Examiner* — Francis M Legasse, Jr.
(74) *Attorney, Agent, or Firm* — Schwabe, Williamson & Wyatt, P.C.

(57) ABSTRACT

Embodiments of the present disclosure are directed towards a micro-electromechanical system (MEMS) sensing device, including a laser arrangement configured to generate a light beam, a first waveguide configured to receive and output a first portion of the light beam, and a second waveguide having a section that is evanescently coupled to the first waveguide and configured to receive and output a second portion of the light beam. The section of the second waveguide is configured to be movable substantially parallel to the first waveguide, wherein a movement of the section of the second waveguide may be caused by an inertial change applied to the sensing device. The movement of the section may cause a detectable change in light intensity between the first and second portions of the light beam. Based on the detected change, the inertial change may be determined. Other embodiments may be described and/or claimed.

20 Claims, 6 Drawing Sheets

(56) References Cited

U.S. PATENT DOCUMENTS

| | | | |
|---|---|---|---|
| 2002/0180978 | A1 | 12/2002 | Berg et al. |
| 2003/0200803 | A1 | 10/2003 | Platt |
| 2003/0206693 | A1 | 11/2003 | Tapalian et al. |
| 2004/0156580 | A1* | 8/2004 | Baumann ........... G02B 6/12007 385/16 |
| 2005/0025419 | A1 | 2/2005 | Fish et al. |
| 2005/0160816 | A1 | 7/2005 | Yu |
| 2005/0268717 | A1 | 12/2005 | Ozawa |
| 2006/0072875 | A1 | 4/2006 | Bhagavatula et al. |
| 2006/0169044 | A1 | 8/2006 | Hodgins et al. |
| 2006/0192974 | A1 | 8/2006 | Li |
| 2006/0198567 | A1 | 9/2006 | Levy et al. |
| 2006/0279862 | A1 | 12/2006 | Elata et al. |
| 2010/0238454 | A1 | 9/2010 | Pruessner et al. |
| 2010/0290060 | A1* | 11/2010 | Mohazzab ............. G01B 11/25 356/492 |
| 2011/0179870 | A1 | 7/2011 | Chan et al. |
| 2011/0303008 | A1 | 12/2011 | Zhang et al. |
| 2013/0330232 | A1 | 12/2013 | Pruessner et al. |
| 2014/0283601 | A1* | 9/2014 | Bhave .................. G01P 15/093 73/504.12 |

FOREIGN PATENT DOCUMENTS

| | | |
|---|---|---|
| EP | 1083429 A2 | 3/2001 |
| GB | 2493585 A | 2/2013 |
| JP | 2002250885 A | 9/2002 |
| JP | 2006064977 A | 3/2006 |
| KR | 1020030080637 A | 10/2003 |
| TW | 1265277 B | 11/2006 |
| WO | 2013052953 A1 | 4/2013 |

OTHER PUBLICATIONS

Eric Ollier, "Optical MEMS Devices Based on Moving Waveguides", IEEE Journal on Selected Topics in Quantum Electronics, vol. 8, No. 1, Jan./Feb. 2002, 8 pages.

Marcel W. Pruessner et al., "End-Coupled Optical Waveguide MEMS Devices in the Indium Phosphide Material System", J. Micromech. Microeng. 16, pp. 832-842, 2006, 11 pages.

Kirill Zinoviev et al., "A Novel Optical Waveguide Microcantilever Sensor for the Detection of Nanomechanical Forces", Journal of Lightwave Technology, vol. 24, No. 5, May 2006, 7 pages.

M. Li et al., "Broadband All-Photonic Transduction of Nanocantilevers", Nat.Nanotechnol.4,377, 2009, 3 pages.

G. Anetsberger et al., "Near-Field Cavity Optomechanics with Nanomechanical Oscillators", Nature Physics, vol. 5, pp. 909-914, Dec. 2009, 6 pages.

Mounier et al., "Status of the MEMS Industry" Yole Développement, Jul. 2012, 3 pages.

T.J. Kippenberg et al., "Cavity Opto—Mechanics", Optical Society of America, 2007, 34 pages.

D.N. Hutchison et al., "Z-Axis Optomechanical Accelerometer", IEEE pp. 615-619, 2012, 5 pages.

A. G. Krause et al., "A high-resolution microchip optomechanical accelerometer," Nature Photonics 6, pp. 768-772, 2012, 2 pages.

B. E. Little et al., "Microring resonator channel dropping filters," Lightwave Technology Journal of, vol. 15, No. 6, pp. 998-1005, 1997, 9 pages.

International Search Report for PCT Application No. PCT/US2014/066702, dated Mar. 6, 2015, 14 pages.

International Search Report for PCT Application No. PCT/US2014/066464, dated Feb. 26, 2015, 14 pages.

International Search Report for PCT Application No. PCT/US2014/066463, dated Mar. 6, 2015, 13 pages.

International Search Report for PCT Application No. PCT/US2014/066462, dated Mar. 17, 2015, 13 pages.

Taiwan Office Action for TW Application No. 103138911, dated Jul. 6, 2015, 14 pages.

Taiwan Office Action for TW Application No. 103139067, dated Jul. 21, 2015, 14 pages.

Taiwan Office Action for TW Application No. 103139069, dated Jul. 21, 2015, 14 pages.

Office Action and Search Report mailed Oct. 2, 2015, in corresponding Taiwan Patent Application No. 103139210, 16 pages.

Hutchison, D.N., et al., "Z-Axis Optomechanical Accelerometer," IEEE, MEMS 2012, Paris, France, Jan. 29-Feb. 2, 2012, pp. 615-619.

* cited by examiner

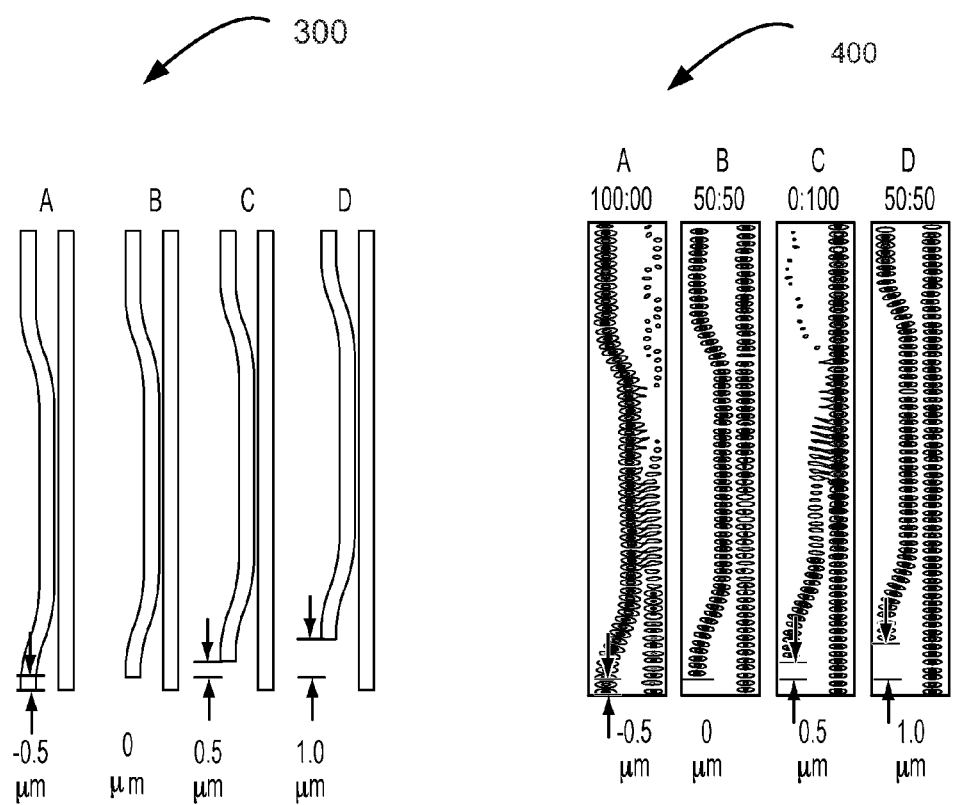
*Fig. 3*            *Fig. 4*
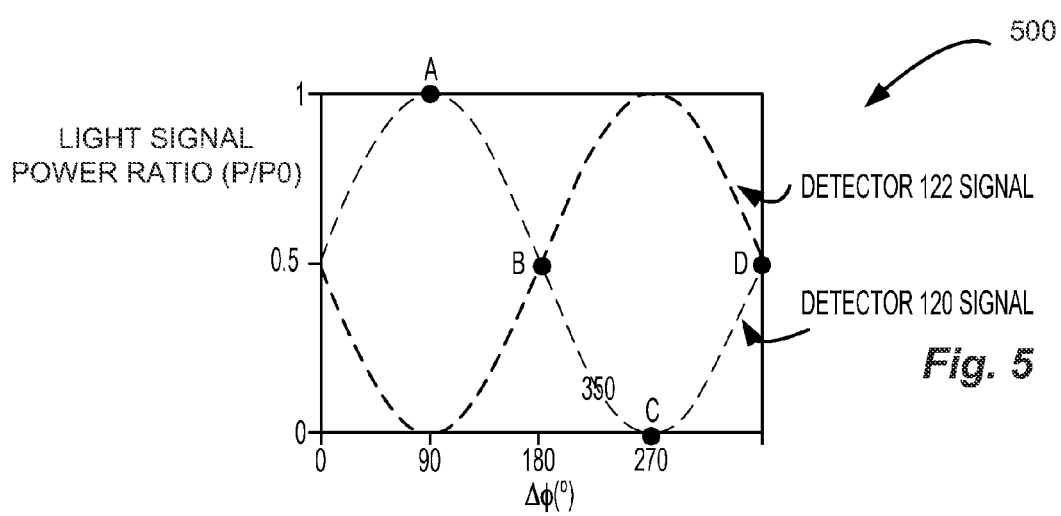
*Fig. 5*

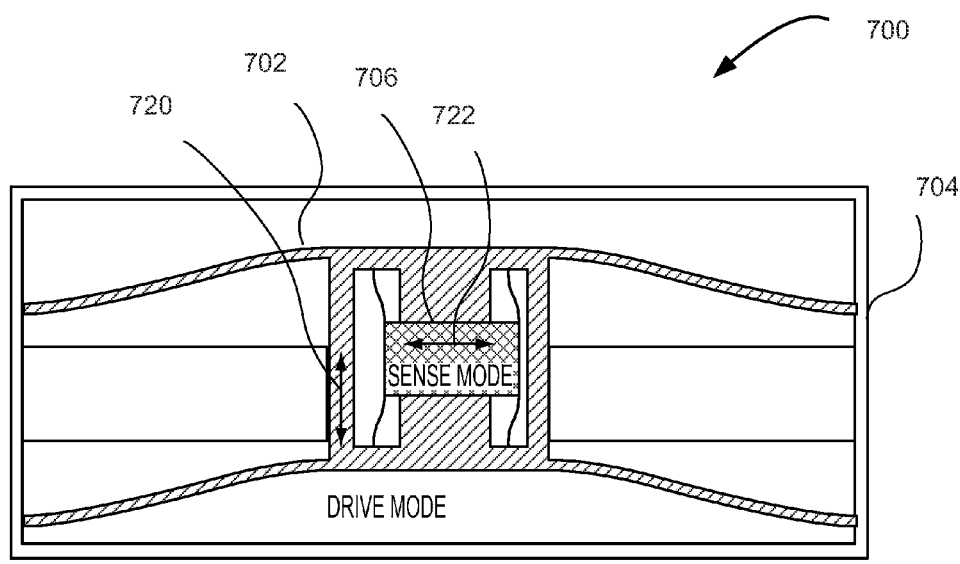
Fig. 7
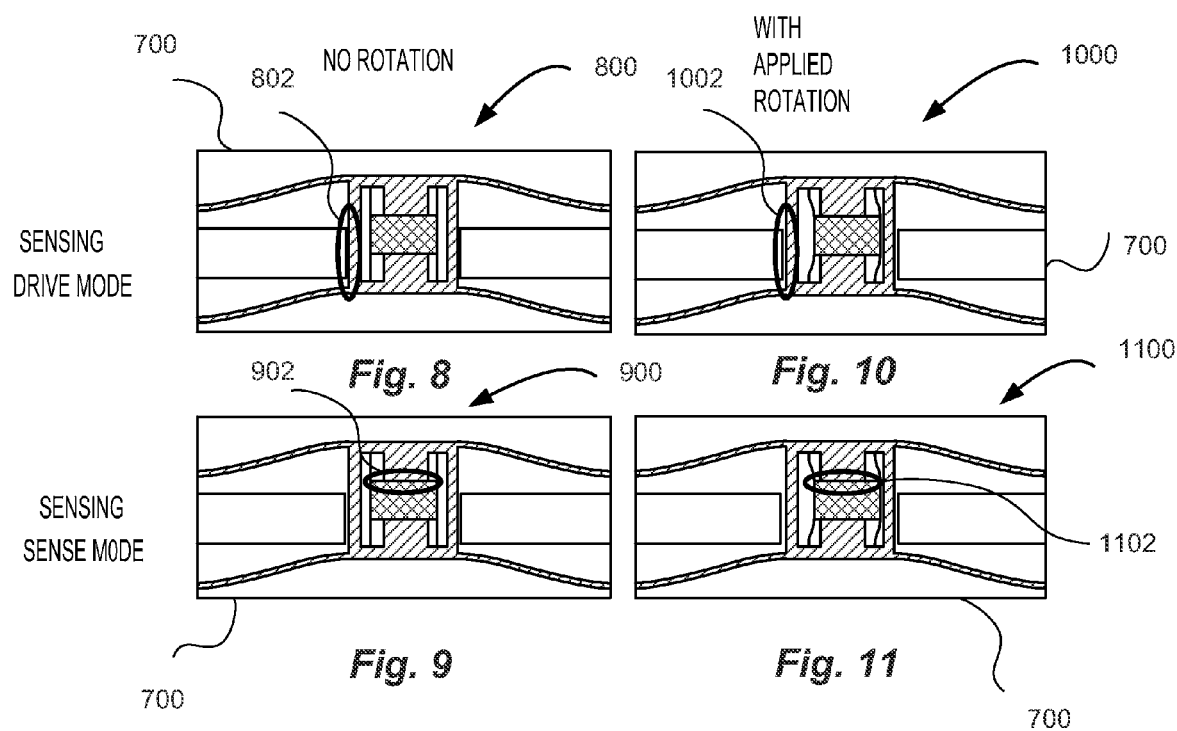
Fig. 8  Fig. 10
Fig. 9  Fig. 11

MEMS APPARATUS WITH A MOVABLE WAVEGUIDE SECTION

FIELD

Embodiments of the present disclosure generally relate to the field of opto-electronics, and more particularly, to using micro-electronic systems for accelerometric and gyroscopic measurements.

BACKGROUND

The market demands and revenues for displacement-sensing devices, such as accelerometers and gyroscopes including micro-electronic systems (MEMS)-based sensors have been growing steadily. The integration of inertial MEMS sensors into a wide range of consumer electronics, cars, and defense applications is driving the need for smaller, cheaper, lower-power, lower-noise, and more accurate sensors. However, technologies for producing micro-scale accelerometers and gyroscopes have remained essentially unchanged since their inception years ago. A typical sensor in an accelerometer or gyroscope may include a movable proof-mass with the proof-mass displacement sensed electrically, e.g., using inter-digitated capacitor plates. However, traditional electrostatic sensing may not allow for scalable production of on-chip sensors, lasers, and detectors, and may not provide sufficient sensitivity or desired sensitivity range.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 3 is a schematic diagram illustrating an example simulation of the waveguide section of the waveguide of the MEMS sensing device in different positions relative to another waveguide, in accordance with some embodiments.

FIG. 4 illustrates an example simulation of the light distribution between the waveguides corresponding to the different relative positions of the waveguides in FIG. 3.

FIG. 5 is a graph illustrating a normalized light signal power output of the MEMS sensing device as a function of light signal phase difference, in accordance with some embodiments.

FIG. 7 as an example configuration of a MEMS sensing device comprising a gyroscope, in accordance with some embodiments.

FIGS. 8-11 illustrate an example MEMS sensing device in different modes pertaining to an accelerometer, configured to measure the accelerometer's sense and drive modes with or without applied external rotation, in accordance with some embodiments.

DETAILED DESCRIPTION

Figure 1:
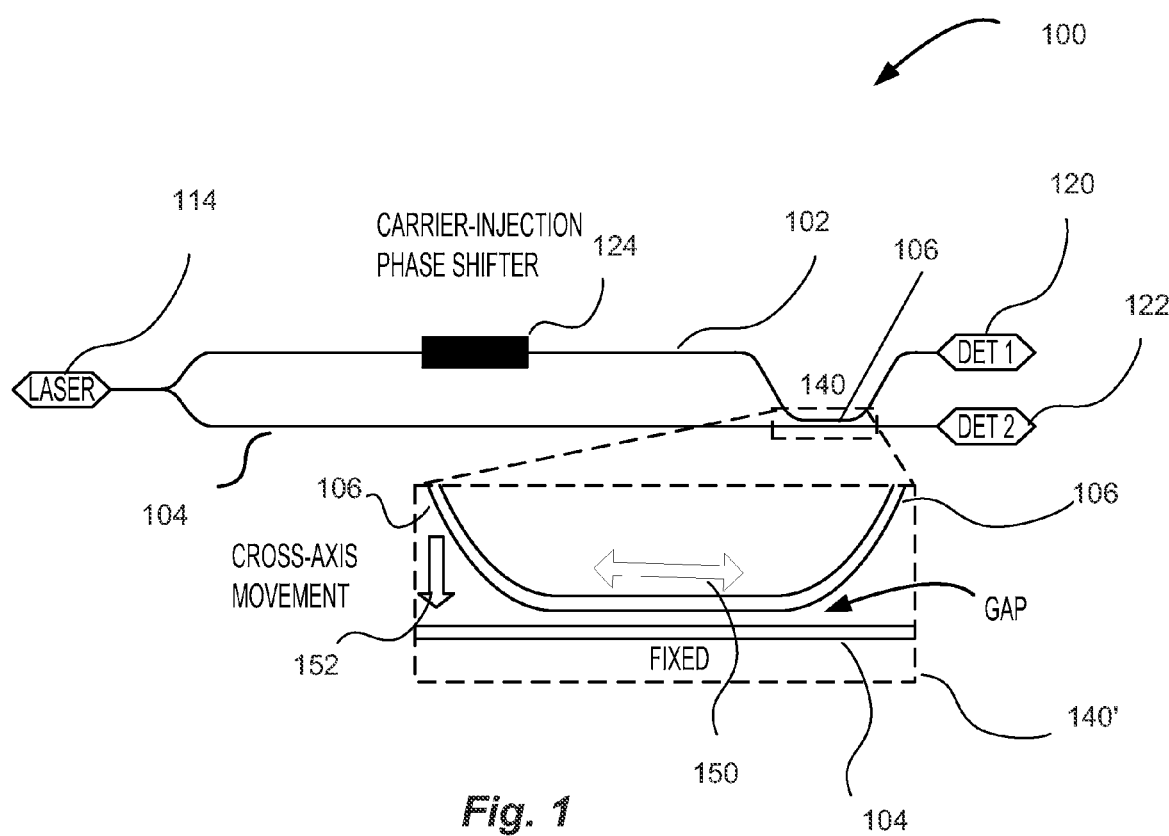
FIGS. 1 and 2 are diagrams schematically illustrating an example MEMS sensing device for sensing inertial change, in accordance with some embodiments.

Embodiments of the present disclosure describe techniques and configurations for providing example MEMS sensing device 100 for sensing inertial change, in accordance with some embodiments. In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact.

In various embodiments, the phrase "a first layer formed, deposited, or otherwise disposed on a second layer," may mean that the first layer is formed, deposited, or disposed over the second layer, and at least a part of the first layer may be in direct contact (e.g., direct physical and/or electrical contact)

or indirect contact (e.g., having one or more other layers between the first layer and the second layer) with at least a part of the second layer.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 2:
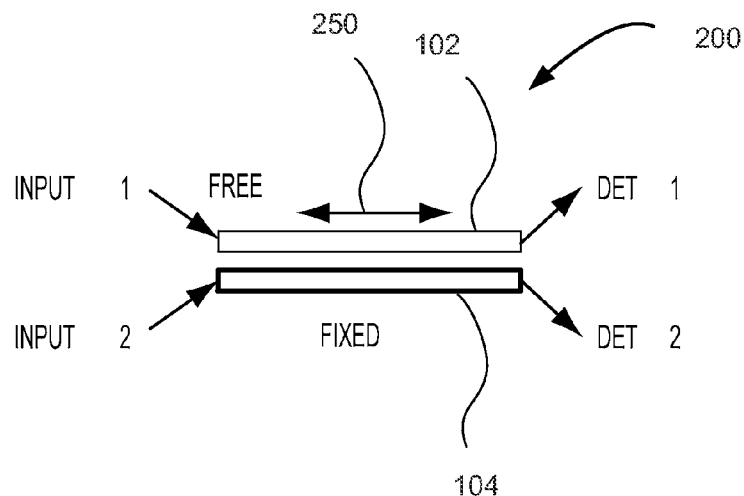

FIGS. 1 and 2 are diagrams schematically illustrating an example MEMS sensing device 100 for sensing inertial change, in accordance with some embodiments. For purposes of explanation, a section 140 of the device 100 demarcated in dashed lines is enlarged and shown within a dashed-line rectangle 140' in FIG. 1. Also for purposes of explanation of the operation of the device 100, FIG. 2 illustrates a simplified example 200 of the device 100. The device 100 includes two evanescently coupled waveguides, 102 and 104, at least sections of which are disposed substantially parallel each other. As illustrated by section 140 of FIG. 1 and shown in greater detail in FIG. 2, at least a section 106 of waveguide 102 may be disposed substantially parallel to waveguide 104 and may be movable substantially parallel to waveguide 104, as indicated by arrows 150 and 250 in FIGS. 1 and 2 respectively. The movement 150 (indicated by numeral 250 in FIG. 2) of the waveguide 102 (or section 106) relative to waveguide 104 will be hereinafter called a "shearing" movement. Cross-axis movement of waveguide 102 (section 106) indicated by arrow 152 may be undesirable and will be discussed below in greater detail. The waveguide 104 may be configured to be immovable, e.g., fixed in a determined position relative to waveguide 102. A gap between section 106 and waveguide 104 indicated in 140' may be configured to provide for evanescent wave effect between waveguides 102 and 104.

A light beam from a light source such as a laser arrangement 114 may be split into two portions (shown in FIG. 2 as INPUT 1 and INPUT 2), which may be sent through both waveguides 102 and 104 and outputted (DET 1 and DET 2) to detectors 120 and 122 respectively. A phase of light in one waveguide, e.g., waveguide 102 may be controlled by a phase shifter 124. The phase shifter 124 may comprise a carrier-injection phase shifter, such as a quadrature bias diode or electro-optic phase tuner. In some embodiments, the phase may be controlled such that the light intensity of the light beam may be divided substantially equally between the portions of light passing through waveguides 102 and 104 at a rest position of the device 100.

FIG. 3 is a schematic diagram illustrating an example simulation 300 of the waveguide section 106 of the waveguide 104 in different positions A, B, C, D, relative to waveguide 102 of the MEMS sensing device described above, in accordance with some embodiments. More specifically, simulation 300 illustrates the instances where the waveguide 104 including the launch field is physically moved by amounts equal to −λ/4 (position A), 0λ/4 (position B), +λ/4 (position C), +2λ/4 (position D), where λ is the wavelength in the waveguide measured, e.g., in microns. FIG. 4 illustrates an example simulation 400 of the light distribution between the waveguides 102 and 104 corresponding to the different positions A, B, C, D of the waveguide 104 in FIG. 3. More specifically, in FIG. 4, light distribution between the waveguides indicated by letter A corresponds to position A of the waveguides in FIG. 3, light distribution between the waveguides indicated by letter B corresponds to position B of the waveguides in FIG. 3, light distribution between the waveguides indicated by letter C corresponds to position C of the waveguides in FIG. 3, and light distribution between the waveguides indicated by letter D corresponds to position D of the waveguides in FIG. 3.

FIG. 5 is a graph 500 illustrating a normalized light signal power output P/P0 (detected by the detectors 120 and 122 respectively) as a function of light signal phase difference 4, where P0 is the total input power of the light beam of the MEMS sensing device, in accordance with some embodiments. The light signal power corresponds to light intensity and will be used hereinafter interchangeably with light intensity. As shown, due to the phase shift control of the input signal in one waveguide (e.g. 102 as described in reference to FIG. 1), the P/P0 ratio may be 0.5 at a rest position of the device 100. The normalized signal power output corresponds to the examples of light distribution in the waveguides 102 and 104, as shown in FIG. 4, that in turn correspond to positions A, B, C, and D of the waveguides in FIG. 3. As simulation 400 and graph 500 illustrate, the effect of superimposition of the light beam portions passing through the waveguides 102 and 104 may result in various degrees of interference occurring between the light beam portions, ranging from constructive interference (points B and D in graph 500) to destructive interference (points A and C in graph 500). Accordingly, light intensity between the portions of light beam passing through the waveguides 102 and 104 may change and be detected by the detectors 120 and 122.

As shown in FIGS. 3-5, the displacement of the waveguide 104 relative to waveguide 102 from position B to positions A or C is equal to quarter of a wavelength in the waveguide. More specifically, if one waveguide (e.g., 104) including its launch field may be physically movable from its initial position B, each of the relative waveguide displacement indicated by positions A, C, D may be attainable. Accordingly, the motion of the movable waveguide 102 with respect to the "fixed" waveguide 104 may be transduced, resulting in detectable and measureable wavelength changes, which in turn may result in detectable change in light intensity between the light beam portions detected by detectors 120 and 122. The physical movement of the waveguide 102 relative waveguide 104 may occur in response to an inertial change, such as external acceleration, applied to the sensing device 100.

Consider three modes of operation of the sensing device 100. Referring to graph 500, in the first mode of operation the sensing device 100 may be calibrated (e.g., using the phase shifter 124) to operate within the linear region near point B. The small motions of the sensing device 100 and corresponding changes in light intensity may be transduced by monitoring the two detectors 120, 122 to determine, for example, a deviation of the output ratio of two light beam portions from 50:50. The slope of the graph 500 at the linear region near B may be described as $dP/d\Delta\phi = P0/2$. Assuming, for example, that the wavelength in the material is ~1μ with 0.1 mW power input, movement of the waveguide 104 of about ±32 nm may result in power modulation of ±10%. Accordingly, the sensing device 100 may be calibrated to transduce small movements of the waveguide 102 relative to the waveguide 104. For example, the full wavelength in free space may be 1.3 um. For a particular waveguide configuration this may correspond to a wavelength in the waveguide of 440 nm, and a quarter of this wavelength is 110 nm, corresponding to the displacement from B to C (FIG. 3).

The second mode of operation of the sensing device 100 may be similar to the first mode of operation, but instead of detecting changes in the output ratio at the two detectors 122 and 120, an active feedback loop may be introduced (not shown) that may control the phase shifter 124, keeping the output power ratio fixed at 50:50. In the third mode of operation, the sensing device 100 may be configured to transduce larger motions of the waveguide 104 by counting fringes as the output goes from A to B to C to D to A etc. "Counting fringes" means that rather than transducing inertial forces based on a small linear region of the sinusoidal response around B (in FIG. 5), larger displacements may be allowed, which trace out the entire non-linear sine curve A to B to C to D, possibly multiple times. By detecting where along the sine curve period(s) the power output value is, the displacement may be determined. For example, each time the ratio is determined to be around 100:0 the waveguide 104 may have moved an additional length equal to one wavelength in the waveguide 104.

Figure 6:
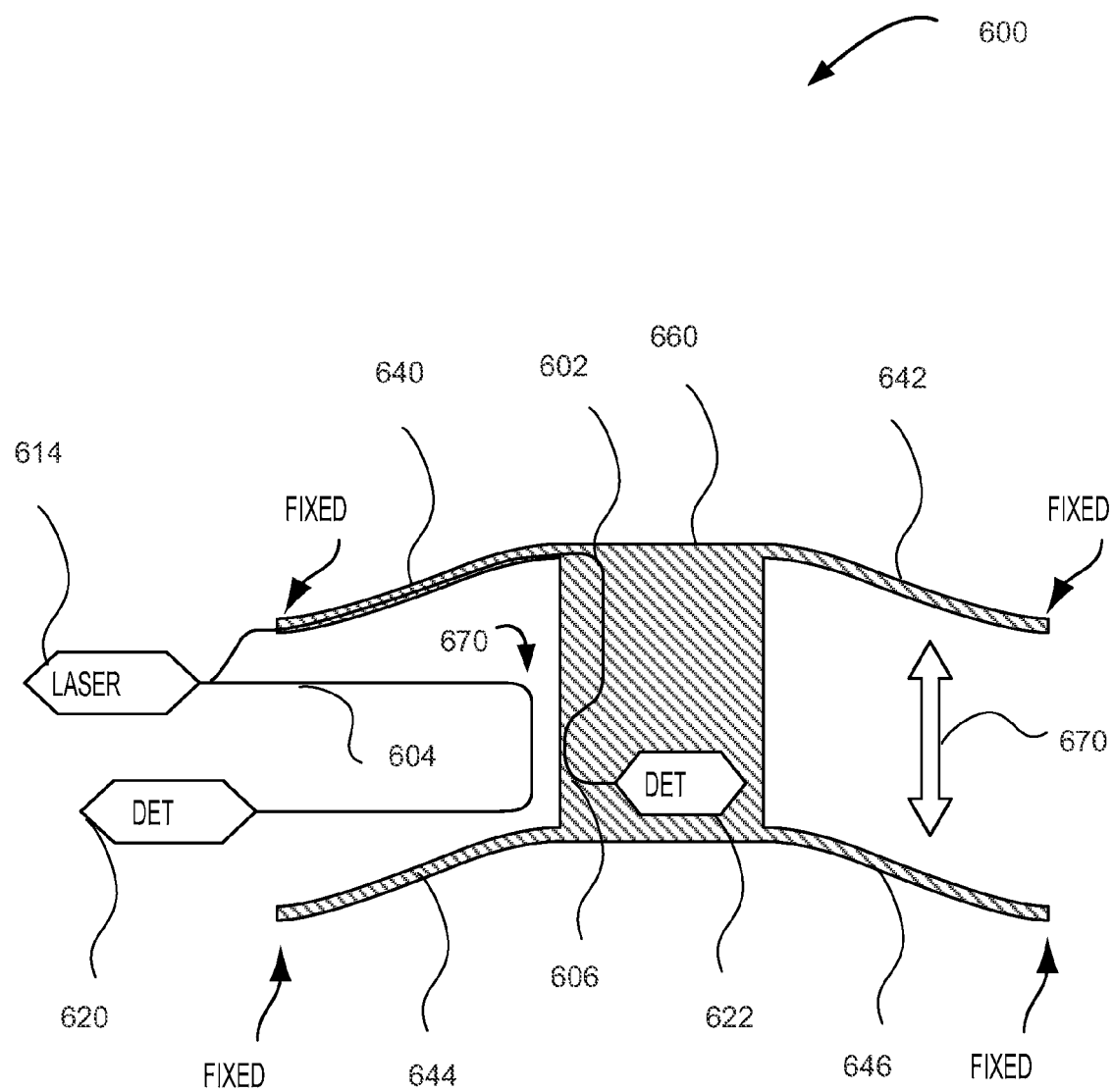
FIG. 6 illustrates an example assembly including a MEMS sensing device similar to device of FIG. 1 and configured to avoid cross-axis movement of the movable waveguide, in accordance with some embodiments.

As noted above, "shearing" movement of the waveguide 102 (or its section 106) relative to the waveguide 104 is desirable, while cross-axis movement of the waveguide 104 may not be, due to potential distortions of the light intensity changes detected as a result of the "shearing" movement of the waveguide 102 and subsequent errors in estimating corresponding inertial changes. FIG. 6 illustrates an example assembly 600 including a MEMS sensing device similar to device 100 and configured to avoid cross-axis movement of the waveguide 102. The assembly 600 may include a proof mass 660 having four "legs" (e.g., spring arrangements) 640, 642, 644, and 646. The assembly 600 may further include a sensing device 670 comprising waveguides 602 and 604 (similar to 102 and 104), where at least a section 606 (similar to 106) of the waveguide 604 may be disposed on the proof mass 660. As shown, the section 606 is disposed substantially parallel to the waveguide 602.

The assembly 600 may further include detectors 622 and 620 (similar to 122 and 120) and the light source, e.g., laser 614 configured to provide a laser beam to be split between the waveguides 602, 604 as described in reference to FIG. 1. The legs 640, 642, 644, and 646 may be fixed on their outermost points to a fixed frame (not shown) and may be configured to be deformable, e.g., stretchable or bendable. Accordingly, the proof mass 660 may be movable in one direction, e.g., up and down, as shown by arrow 670 in FIG. 6, due to the legs deformation. The legs may be manufactured with desired thickness so as to avoid cross-axis movement of the proof mass 660 and corresponding cross-axis movement of the section 606 of the waveguide 604. Furthermore, the legs need not be straight. In some embodiments, the legs may include one or more bent sections with the waveguide running along the bends with a large enough radius of curvature so as not to cause significant optical loss. In operation, an external acceleration may cause the proof mass 660 to move relative to the frame, deforming the legs 640, 642, 644, and 646, and shifting the launch field in the waveguide 604 attached to the proof mass 660. (The deformation of the legs 640, 642, 644, and 646 is exaggerated for simplicity purposes in FIG. 6.)

Several points may be noted in regard to the assembly 600. For example, the bending of the waveguide 602 due to running along a bending flexure may cause stress-optical effects, shifting the phase of the input light. However, detailed research has shown that this may have a negligible effect on the inertial change sensing described above. In another example, the detector 622 formed on the assembly 600 may be sensitive to cross-axis movement. However, installing an additional sensing device (e.g., identical to 622) on the other side (e.g., right side) of the proof mass 660 in FIG. 6 may report an opposite result, which may be linear for cross-axis movements. Accordingly, the effect of cross-axis movements may be canceled by providing two sensing devices on each side of the proof mass 600 and finding the sum of the detector signals.

The assembly 600 may be relatively power-insensitive, configured to tolerate substantial optical powers, up until nonlinear optical thresholds of the waveguides 602 and 604. Traditional electrostatic MEMS sensing device may require a trade-off between sensitivity (the smallest measurable signal, or the smallest measurable change in signal) and dynamic range (the largest measurable signal before saturation or failure). By contrast, in the described sensing device the sensitivity may be dictated by the geometry of the waveguides 602, 604 and the dynamic range in the third mode of operation described above may be set by the geometry of the "legs" 640, 642, 644, and 646, which determines how far the proof mass 660 may move in a "shearing" motion.

A displacement and corresponding power change for the waveguides 602, 604 may be calculated as follows. If the power of the light beam in waveguide 604 is 100%, then the power in waveguide 602 may be calculated as:

$$P = P_{max} \sin^2\left(\frac{\pi n_{eff}}{\lambda_0} x + \delta\right) \qquad \text{Equation 1}$$

Where Pmax is the peak power of the sine-squared function, $\lambda_0$ is the wavelength in free space so that the wavelength in the waveguide is $\lambda_0/n_{eff}$, x is the displacement of one of the waveguides relative to the other, and δ is initial phase offset, which may be controlled using a phase shifter such as electro-optic phase tuner. It is desired to have the P at the point of steepest slope of the sine-squared function above, accordingly, a baseline power output at the detector is not Pmax, but approximately one half of Pmax:

$$P_0 = P_{max}/2 \qquad \text{Equation 2}$$

Accordingly, the Equation 1 may be rewritten as follows:

$$\frac{P}{P_0} = 2 \sin^2\left(\frac{\pi n_{eff}}{\lambda_0} x + \delta\right) \qquad \text{Equation 3}$$

Differentiating this gives the resulting fractional power change at the detector d $(P/P_0)$ when a small displacement dx occurs:

$$\frac{d(P/P_0)}{dx} = \frac{\pi n_{eff}}{\lambda_0} \sin\left(2\frac{\pi n_{eff}}{\lambda_0} x + 2\delta\right) \qquad \text{Equation 4}$$

Note that in one mode of operation, it is desired to have a steepest point of the original function, i.e., at the point where the slope is maximized. Accordingly, the "sine" part of the last equation may be equal to +1 (or −1). Thus, the displacement sensitivity for small displacements around the point of steepest slope is:

$$\left.\frac{d(P/P_0)}{dx}\right|_{x_{steepest}} = \frac{\pi n_{eff}}{\lambda_0} \qquad \text{Equation 5}$$

For example, if $n_{eff}=3.0$, and $\lambda_0=1.31$ um, we have:

$$\left.\frac{d(P/P_0)}{dx}\right|_{x_{steepest}} = 0.007 \text{ nm}^{-1} \qquad \text{Equation 6}$$

In other words, the measured output power may change by 0.7% for every nanometer of displacement. For example, for 14 nm of displacement we may have 10% output power change. Accordingly, reasonable fabrication lengths of a few tens of wavelengths long may be provided for manufacturing waveguides 602 and 604.

Once we have the x-displacement measurement, acceleration may be calculated considering the following: the force causing the acceleration of the proof mass obeys Hooke's law, F=kx, where k is the spring constant of the springs. It also obeys Newton's second law, F=ma, where m is the mass. Thus, kx=ma. Accordingly, acceleration may be calculated as $$a=(m/k)*x \qquad \text{Equation 7}$$

The above described embodiments may be directed towards accelerometry sensing and measurements. Different types of sensors such as MEMS gyroscopes may also be provided using the above-described technique. FIGS. 7-11 illustrate example embodiments of MEMS sensing devices configured to measure angular velocity using the above described technique.

FIG. 7 as an example configuration of a MEMS sensing device 700 such as a gyroscope, in accordance with some embodiments. The sensing device 700 includes an outer proof mass 702 affixed to a fixed frame 704. The proof mass 702 may be configured similar to one described in reference to FIG. 6 and accordingly may include a sensing device similar to one described in reference to FIG. 6 (not shown in FIG. 7 for simplicity). The proof mass 702 may be configured to move in the direction indicated by arrow 720 (drive mode).

The device 700 may further include an inner proof mass 706 (also configured similar to one described in reference to FIG. 6 and including a similar sensing device that is not shown for simplicity) that is free to move in the direction indicated by arrow 722 (sense mode), e.g., perpendicular to the drive mode. In some embodiments, the inner proof mass 706 may be disposed within the outer proof mass 702. In other embodiments, the inner and outer proof masses 702 and 706 may be disposed separately due to inertial forces and affixed to the frame 704. The outer proof mass 702 may be excited at a determined drive frequency "ω drive," e.g., using a "drive" set of comb fingers (not shown for clarity), in order to provide for the Coriolis force (calculated to determine rotation speed) to be measurable.

Calculation of x displacement may be conducted in the same way as described above and applied to a formula below in order to obtain rotation rate. In the presence of an overall rotation in the z-direction, there is an acceleration ("Coriolis acceleration") of the inner proof mass of a C=−2Ω×v, where Ω is the rotation rate vector and v is the velocity vector. For simplicity, assume Ω and v are perpendicular. Again using ma=kx, and applying the Coriolis acceleration above, we have:

$$\Omega=(-k/2mv)x \qquad \text{Equation 8}$$

where m is the mass of the inner mass and k is its spring constant.

FIGS. 8-11 illustrate an example MEMS sensing device 700 in different modes pertaining to an gyroscope, specifically, configured to measure the gyroscope's sense and drive modes with or without applied external rotation, e.g., gyroscopes 800, 900, 1000, and 1100 configured as described in reference to FIG. 7. More specifically, device 700 may be configured to sense the drive mode and sense mode without or with applied external rotation. For example, device 700 may sense the drive mode and sense mode without applied external rotation in states 800 and 900 respectively and may sense the drive mode and sense mode with applied external rotation in states 1000 and 1100 respectively. When subject to external rotation (in plane with the page), the inner proof mass 706 may move at a frequency "ω sense"="ω drive." The device 700 may be configured to detect the motion of either the sense mode or the drive mode in states 800, 900, 1000, and 1100 at the locations of the black ellipses indicated by numerals 802, 902, 1002, and 1102 respectively.

Figure 12:
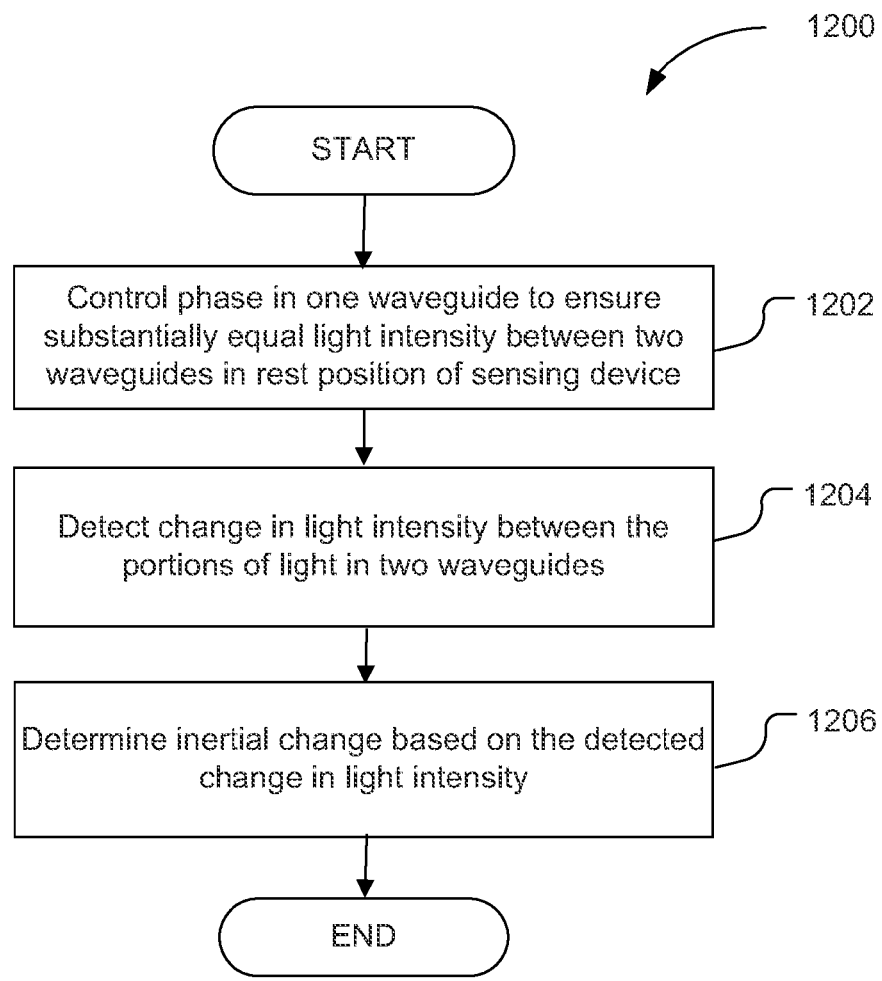
FIG. 12 schematically illustrates a flow diagram for a method of operating a MEMS sensing device, in accordance with some embodiments.

FIG. 12 is a process flow diagram illustrating operation of the MEMS sensing device 100 as described in reference to FIG. 1, in accordance with some embodiments. The process 1200 may begin at block 1202, where the phase of the light beam portion in at least one waveguide (e.g., waveguide 102) may be controlled, for example, with a phase shifter 124. The phase may be controlled to ensure that in a rest (or initial) position of the device 100 the light intensity of the light beam may be divided substantially equally between the portions of light passing through the waveguides 102 and 104, in order to ensure detectability of light intensity changes when the device 100 moves in response to an external acceleration, causing the movable waveguide to move relative to the fixed waveguide, as described above.

At block 1204, a change in light intensity between the portions of the light beam passing through each of the two waveguides of the device may be detected, e.g., using detectors 120 and 122. The change may occur in response to a substantially parallel displacement of the waveguide 104 (or the section 106 of the waveguide 104) relative to the waveguide 102. As described above, the displacement may occur as a result of external acceleration applied to the device 100 or an apparatus including the device 100.

At block 1206, inertial change (e.g., external acceleration or rotation) applied to the device 100 (or apparatus including device 100) may be determined, based on the detected light intensity change. As described above, the device 100 may be calibrated to transduce movements of the waveguide 104 relative to the waveguide 102 based on detected power (light intensity) changes. The movements of the waveguide 104 and corresponding changes in light intensity correspond to inertial change resulting from external acceleration or rotation applied to the device 100 (or apparatus including device 100). The acceleration or rotation may be calculated based on these dependencies. Knowing how much the detected light has changed d(P/P0) in Equation 4, and knowing the geometrical and other factors on the right hand side of Equation 4, the displacement dx may be transduced using Equation 4. From that the acceleration may be calculated using Equation 7 or the rotation rate may be calculated using Equation 8. Various operations are described as multiple discrete operations in turn, in a manner that is most helpful in understanding the claimed subject matter. However, the order of description should not be construed as to imply that these operations are necessarily order dependent. Embodiments of the present disclosure may be implemented into a system or apparatus using any suitable hardware and/or software to configure as desired.

Figure 13:
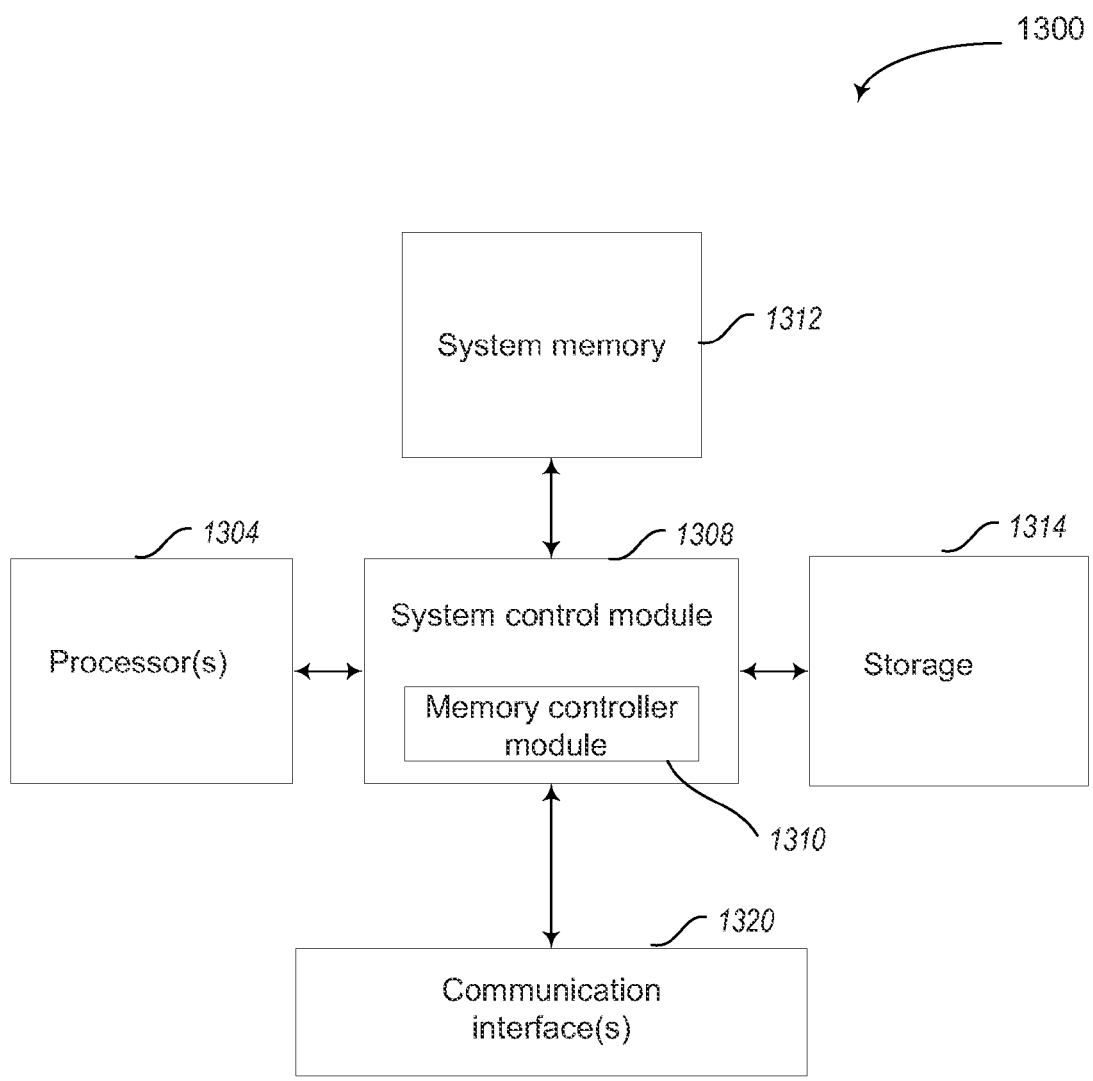
FIG. 13 schematically illustrates an example computing device including a MEMS sensing device, in accordance with some embodiments.

FIG. 13 schematically illustrates an example system that may be used to practice various embodiments described herein. FIG. 13 illustrates, for one embodiment, an example system 1300 having one or more processor(s) 1304, system control module 1308 coupled to at least one of the processor(s) 1304, system memory 1312 coupled to system control module 1308, non-volatile memory (NVM)/storage 1314 coupled to system control module 1308, and one or more communications interface(s) 1320 coupled to system control module 1308.

In some embodiments, the system 1300 may include a device 100, assembly 600, or device 700 and provide logic/module that performs functions aimed at detecting change of light intensity and calculating external acceleration and/or rotation applied to the system and/or other modules described herein. For example, the device 100, assembly 600, or device 700 may be disposed in a chip included in the system 1300. In some embodiments, the system 1300 may include one or more computer-readable media (e.g., system memory or NVM/storage 1314) having instructions and one or more processors (e.g., processor(s) 1304) coupled with the one or more computer-readable media and configured to execute the instructions to implement a module to perform light intensity change detection and inertial change calculation actions described herein.

System control module 1308 for one embodiment may include any suitable interface controllers to provide for any suitable interface to at least one of the processor(s) 1304 and/or to any suitable device or component in communication with system control module 1308.

System control module 1308 may include memory controller module 1310 to provide an interface to system memory 1312. The memory controller module 1310 may be a hardware module, a software module, and/or a firmware module. System memory 1312 may be used to load and store data and/or instructions, for example, for system 1300. System memory 1312 for one embodiment may include any suitable volatile memory, such as suitable DRAM, for example. System control module 1308 for one embodiment may include one or more input/output (I/O) controller(s) to provide an interface to NVM/storage 1314 and communications interface(s) 1320.

The NVM/storage 1314 may be used to store data and/or instructions, for example. NVM/storage 1314 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example. The NVM/storage 1314 may include a storage resource physically part of a device on which the system 1300 is installed or it may be accessible by, but not necessarily a part of, the device. For example, the NVM/storage 1314 may be accessed over a network via the communications interface(s) 1320.

Communications interface(s) 1320 may provide an interface for system 1300 to communicate over one or more network(s) and/or with any other suitable device. The system 1300 may wirelessly communicate with the one or more components of the wireless network in accordance with any of one or more wireless network standards and/or protocols.

For one embodiment, at least one of the processor(s) 1304 may be packaged together with logic for one or more controller(s) of system control module 1308, e.g., memory controller module 1310. For one embodiment, at least one of the processor(s) 1304 may be packaged together with logic for one or more controllers of system control module 1308 to form a System in Package (SiP). For one embodiment, at least one of the processor(s) 1304 may be integrated on the same die with logic for one or more controller(s) of system control module 1308. For one embodiment, at least one of the processor(s) 1304 may be integrated on the same die with logic for one or more controller(s) of system control module 1308 to form a System on Chip (SoC).

In various embodiments, the system 1300 may have more or less components, and/or different architectures. For example, in some embodiments, the system 1300 may include one or more of a camera, a keyboard, liquid crystal display (LCD) screen (including touch screen displays), non-volatile memory port, multiple antennas, graphics chip, application-specific integrated circuit (ASIC), and speakers.

In various implementations, the system 1300 may be, but is not limited to, a mobile computing device (e.g., a laptop computing device, a handheld computing device, a tablet, a netbook, etc.), a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the system 1300 may be any other electronic device.

The embodiments described herein may be further illustrated by the following examples. Example 1 is an apparatus method comprising micro-electromechanical system (MEMS) apparatus, comprising: a laser arrangement configured to generate a light beam; a first waveguide configured to receive and output a first portion of the light beam; and a second waveguide having a section that is evanescently coupled to the first waveguide, the second waveguide configured to receive and output a second portion of the light beam, wherein the section of the second waveguide is configured to be movable substantially parallel to the first waveguide, wherein a movement of the section of the second waveguide may cause a detectable change in light intensity between the first and second portions of the light beam.

Example 2 may include the subject matter of Example 1, and further specifies that the apparatus comprises a phase shifter coupled with the second waveguide and configured to control a phase shift to the second portion of the light beam relative to the first portion of the light beam, to provide substantially equal division of the light intensity between the first and second portions of the light beam before the detectable change in light intensity occurs.

Example 3 may include the subject matter of Example 2, and further specifies that the phase shifter comprises a carrier-injection phase shifter, including a quadrature bias diode or electro-optic phase tuner.

Example 4 may include the subject matter of Example 1, and further specifies that the apparatus includes a first detector coupled to the first waveguide and configured to detect light intensity of the first portion of the light beam; and a second detector coupled to the second waveguide to detect light intensity of the second portion of the light beam.

Example 5 may include the subject matter of any of Examples 1 to 4, and further specifies that the apparatus further comprises a first proof mass movably affixed to a frame such that the first proof mass is movable at least in one direction relative to the frame, wherein the section of the second waveguide is disposed on the first proof mass, wherein a movement of the first proof mass causes the section of the second waveguide to move substantially parallel to the first waveguide.

Example 6 may include the subject matter of Example 5, and further specifies that the first proof mass structure is affixed to the frame by at least two spring arrangements.

Example 7 may include the subject matter of Example 5, and further specifies that the movement of the first proof mass is caused by an external acceleration applied to the apparatus, wherein the apparatus comprises an accelerometer.

Example 8 may include the subject matter of Example 5, and further specifies that the apparatus comprises a first assembly, wherein the apparatus further includes a second assembly comprising a third waveguide configured to receive and output a third portion of the light beam; a fourth waveguide having at least a section that is evanescently coupled to the third waveguide, the fourth waveguide configured to receive and output a fourth portion of the light beam that is phase-shifted relative to the third portion; a third detector coupled to the third waveguide and configured to detect light intensity of the third portion of the light beam; and a fourth detector coupled to the fourth waveguide and configured to detect light intensity of the fourth portion of the light beam, wherein the section of the fourth waveguide is configured to be movable substantially parallel to the third waveguide in response to another displacement of the apparatus, wherein a movement of the portion of the fourth waveguide causes a detectable change in light intensity between the third and fourth portions of the light beam.

Example 9 may include the subject matter of Example 8, and further specifies that the section of the fourth waveguide is disposed on a second proof mass, wherein a movement of the second proof mass causes the portion of the fourth waveguide to move substantially parallel to the second waveguide.

Example 10 may include the subject matter of Example 9, and further specifies that the second proof mass structure is movably affixed to the frame such that the proof mass is movable at least in another direction relative to the frame, the another direction being perpendicular to the at least one direction.

Example 11 may include the subject matter of Example 10, and further specifies that the second proof mass is disposed on the first proof mass.

Example 12 may include the subject matter of Example 9, and further specifies that the movement of the second proof mass is caused by an external rotation of the frame, wherein the apparatus comprises a gyroscope.

Example 13 is a system, comprising a computing device; and a micro-electromechanical system (MEMS) apparatus coupled to the computing device, the apparatus comprising: a laser arrangement configured to generate a light beam; a first waveguide configured to receive and output a first portion of the light beam; and a second waveguide having a section that is evanescently coupled to the first waveguide, the second waveguide configured to receive and output a second portion of the light beam, wherein the section of the second waveguide is configured to be movable substantially parallel to the first waveguide, wherein a movement of the section of the second waveguide causes a detectable change in light intensity between the first and second portions of the light beam.

Example 14 may include the subject matter of Example 13, and further specifies that system further comprises a first detector coupled to the first waveguide and configured to detect light intensity of the first portion of the light beam; and a second detector coupled to the second waveguide to detect light intensity of the second portion of the light beam.

Example 15 may include the subject matter of Example 14, and further specifies that the system includes circuitry coupled to the first and second detectors to determine an inertial change associated with the system based on light intensities of the first and second portions respectively detected by the first and second detectors.

Example 16 may include the subject matter of Example 15, and further specifies that the MEMS apparatus is disposed in a chip coupled to the computing device.

Example 17 may include the subject matter of Example 16, and further specifies that the system comprises a mobile computing device.

Example 18 includes a method, comprising: controlling light intensity of at least one of a first and second portions of a light beam passing through a first and second waveguide of a micro-electromechanical system (MEMS) apparatus to provide a substantially equal division of light intensities between the first and second portions, wherein at least a section of the second guideline is evanescently coupled to the first waveguide and is configured to be movable substantially parallel to the first waveguide in response to an inertial change associated with the apparatus; detecting a change in the light intensities between the first and second portions caused by a movement of the portion of the second waveguide relative to the first waveguide; and determining the inertial change applied to the apparatus that caused the change in the respective light intensities, based on a result of the detecting.

Example 19 may include the subject matter of Example 18, and further specifies that the controlling includes phase-shifting the second portion of the light beam relative to the first portion of the light beam.

Example 20 may include the subject matter of any of Examples 18-19, and further specifies that the inertial change includes external rotation of the apparatus or external acceleration of the apparatus.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

What is claimed is:

1. A micro-electromechanical system (MEMS) apparatus, comprising:
   a laser arrangement to generate a light beam;
   a first waveguide having a first section that is substantially straight and is fixed in a determined position, wherein the first waveguide is to receive and output a first portion of the light beam; and
   a second waveguide having a second section that is substantially straight and disposed substantially parallel to the first section, wherein the second section is evanescently coupled to the first section, wherein the second waveguide is to receive and output a second portion of the light beam, wherein the second section of the second waveguide is movable substantially parallel to the first section, wherein a movement of the second section of the second waveguide substantially parallel to the first section is to causes a detectable change in light intensity between the first and second portions of the light beam.

2. The apparatus of claim 1, further comprising a phase shifter coupled with the second waveguide to control a phase shift to the second portion of the light beam relative to the first portion of the light beam, to provide substantially equal division of the light intensity between the first and second portions of the light beam before the detectable change in light intensity occurs.

3. The apparatus of claim 2, wherein the phase shifter comprises a carrier-injection phase shifter, including a quadrature bias diode or electro-optic phase tuner.

4. The apparatus of claim 1, further comprising:
a first detector coupled to the first waveguide and to detect light intensity of the first portion of the light beam; and
a second detector coupled to the second waveguide to detect light intensity of the second portion of the light beam.

5. The apparatus of claim 1, further comprising:
a first proof mass movably affixed to a frame such that the first proof mass is movable at least in one direction relative to the frame, wherein the second section of the second waveguide is disposed on the first proof mass, wherein a movement of the first proof mass causes the second section of the second waveguide to move substantially parallel to the first section of the first waveguide.

6. The apparatus of claim 5, wherein the first proof mass is affixed to the frame by at least two spring arrangements.

7. The apparatus of claim 5, wherein the movement of the first proof mass is caused by an external acceleration applied to the apparatus, wherein the apparatus comprises an accelerometer.

8. The apparatus of claim 5, wherein the apparatus comprises a first assembly, wherein the apparatus further includes a second assembly comprising:
a third waveguide to receive and output a third portion of the light beam;
a fourth waveguide having at least a section that is evanescently coupled to the third waveguide, the fourth waveguide to receive and output a fourth portion of the light beam that is phase-shifted relative to the third portion;
a third detector coupled to the third waveguide to detect light intensity of the third portion of the light beam; and
a fourth detector coupled to the fourth waveguide to detect light intensity of the fourth portion of the light beam,
wherein the section of the fourth waveguide is to be movable substantially parallel to the third waveguide in response to another displacement of the apparatus, wherein a movement of the section of the fourth waveguide causes a detectable change in light intensity between the third and fourth portions of the light beam.

9. The apparatus of claim 8, wherein the section of the fourth waveguide is disposed on a second proof mass, wherein a movement of the second proof mass causes the section of the fourth waveguide to move substantially parallel to the second waveguide.

10. The apparatus of claim 9, wherein the second proof mass is movably affixed to the frame such that the proof mass is movable at least in another direction relative to the frame, the another direction being perpendicular to the at least one direction.

11. The apparatus of claim 10, wherein the second proof mass is disposed on the first proof mass.

12. The apparatus of claim 9, wherein the movement of the second proof mass is caused by an external rotation of the frame, wherein the apparatus comprises a gyroscope.

13. A system, comprising:
a computing device; and
a micro-electromechanical system (MEMS) apparatus coupled to the computing device, the apparatus comprising:
a laser arrangement to generate a light beam;
a first waveguide having a first section that is substantially straight and is fixed in a determined position, wherein the first waveguide is to receive and output a first portion of the light beam; and
a second waveguide having a second section that is substantially straight and disposed substantially parallel to the first section, wherein the second section is evanescently coupled to the first section, wherein the second waveguide is to receive and output a second portion of the light beam,
wherein the second section of the second waveguide is movable substantially parallel to the first section, wherein a movement of the second section of the second waveguide substantially parallel to the first section is to causes a detectable change in light intensity between the first and second portions of the light beam.

14. The system of claim 13, further comprising:
a first detector coupled to the first waveguide to detect light intensity of the first portion of the light beam; and
a second detector coupled to the second waveguide to detect light intensity of the second portion of the light beam.

15. The system of claim 14, further comprising:
circuitry coupled to the first and second detectors to determine an inertial change associated with the system based on light intensities of the first and second portions respectively detected by the first and second detectors.

16. The system of claim 15, wherein the MEMS apparatus is disposed in a chip coupled to the computing device.

17. The system of claim 16, wherein the system comprises a mobile computing device.

18. A method, comprising:
controlling light intensity of at least one of first and second portions of a light beam passing respectively through first and second waveguides of a micro-electromechanical system (MEMS) apparatus to provide a substantially equal division of light intensities between the first and second portions, the first waveguide having a first section that is substantially straight and is fixed in a determined position, the second waveguide having a second section that is substantially straight and disposed substantially parallel to the first section, the second section evanescently coupled to the first section and movable substantially parallel to the first section in response to an inertial change associated with the apparatus;
detecting a change in the light intensities between the first and second light portions caused by a movement of the second section of the second waveguide relative to the section of the first waveguide; and determining the inertial change applied to the apparatus that caused the change in the respective light intensities, based on a result of the detecting.

19. The method of claim 18, wherein the controlling includes phase-shifting the second portion of the light beam relative to the first portion of the light beam.

20. The method of claim 18, wherein the inertial change includes external rotation of the apparatus or external acceleration of the apparatus.

* * * * *